(12) United States Patent
Cullinan et al.

(10) Patent No.: US 6,916,421 B1
(45) Date of Patent: Jul. 12, 2005

(54) VERTICAL VORTEX OR LAMINAR FLOW INTERACTIVE BIO MEDIA WATER TREATMENT DEVICE

(76) Inventors: Terry J. Cullinan, P.O. Box 2725, Missoula, MT (US) 59806; Max Weiss, 407 Skidoo Bay, Polson, MT (US) 59860

( * ) Notice: Subject to any disclaimer, the term of this patent is extended or adjusted under 35 U.S.C. 154(b) by 0 days.

(21) Appl. No.: 09/041,685

(22) Filed: Mar. 13, 1998

Related U.S. Application Data

(60) Provisional application No. 60/040,690, filed on Mar. 13, 1997.

(51) Int. Cl.$^7$ .............................. C02F 3/06; C02F 3/10
(52) U.S. Cl. ...................................... 210/615; 210/150
(58) Field of Search ................................ 210/615–618, 210/629, 150, 151; 260/94, DIG. 70

(56) References Cited

U.S. PATENT DOCUMENTS

| | | | | |
|---|---|---|---|---|
| 2,183,657 A | * | 12/1939 | Page ........................... | 261/95 |
| 3,589,518 A | * | 6/1971 | Brebion | |
| 4,208,284 A | * | 6/1980 | Pretorious et al. | |
| 4,294,694 A | * | 10/1981 | Coulthard | |
| 4,333,893 A | * | 6/1982 | Clyde ......................... | 261/94 |
| 4,724,593 A | * | 2/1988 | Lang | |
| 4,908,128 A | * | 3/1990 | Chiba | |
| 5,298,164 A | * | 3/1994 | Hapach et al. ............. | 210/604 |
| 5,543,039 A | * | 8/1996 | Odegaard ................... | 210/150 |
| 5,690,819 A | * | 11/1997 | Chianh | |
| 5,779,886 A | * | 7/1998 | Couture | |
| 5,911,877 A | * | 6/1999 | Perez et al. | |
| 5,981,272 A | * | 11/1999 | Chang | |
| 5,985,148 A | * | 11/1999 | Liu | |
| 6,036,863 A | * | 3/2000 | Brockdorff | |
| 6,210,578 B1 | * | 4/2001 | Sagastume et al. ......... | 210/605 |
| 6,444,126 B1 | * | 9/2002 | Gates et al. ................ | 210/612 |
| 6,447,675 B1 | * | 9/2002 | James ........................ | 210/150 |

FOREIGN PATENT DOCUMENTS

JP   P2001-239293   *   9/2001

* cited by examiner

*Primary Examiner*—Fred G. Prince
(74) *Attorney, Agent, or Firm*—Floyd E. Ivey; Liebler, Ivey, Connor, Berry & St. Hilaire (57) ABSTRACT

A waste liquid treatment system includes a plurality of flow control elements presenting a plurality of waste liquid flow control surfaces. A biofilm covers at least some of the waste liquid flow control surfaces. The flow control surfaces are adapted and constructed to produce alternating venturis and variable speed votices as waste liquid flows through the flow control elements. In an embodiment, each of the flow control elements comprises a series of fins and vanes forming the water flow control surfaces. Each of the flow control elements can include an inner member having a longitudinal axis, with a plurality of vanes extending radially from the longitudinal axis. A cylindrical outer member can be provided surrounding the inner member, the cylindrical outer member having an outer surface including a plurality of radially projecting longitudinal fins formed thereon. In a specific embodiment, the inner member has eight vanes, and the cylindrical outer member is provided with four fins. The flow control elements can be formed from a plastic material. The biofilm can be provided as a biofilm-expressing bacteria, providing an endemnic or seeding biofilm. The nature of the biofilm depends upon the nature of the liquid to be treated and the specific contaminants to be removed. Examples of suitable biofilms include pseudomonous species based biofilm and biofilms including sulfur-reducing bacteria species. A method of treating waste liquid includes the step of providing a plurality of flow control elements presenting a plurality of waste liquid flow control surfaces. Next, at least some of the waste liquid flow control surfaces are covered with a biofilm. The waste liquid is then caused to flow through the flow control elements to produce alternating venturis and variable speed vortices as waste liquid flows through the flow control elements.

10 Claims, 8 Drawing Sheets

VERTICAL VORTEX OR LAMINAR FLOW INTERACTIVE BIO MEDIA WATER TREATMENT DEVICE

REFERENCE

Provisional Patent Application, application No. 60/040,690; Filing Date Mar. 13, 1997.

FIELD OF THE INVENTION

This invention pertains to a process for treating water containing organic and/or inorganic matter. More particularly the invention discloses a process and apparatus consisting of inoculating an input flow with prescribed microorganisms or mixtures thereof in a chamber containing a media designed to effect separation through gravity and coalescence in flow induced vortices.

The invention is an apparatus and a process, for treating water containing organic and/or inorganic matter consisting of inoculating an input flow with prescribed microorganisms or mixtures thereof in a chamber containing a media designed to effect separation through gravity and coalescence in flow induced vortices. The media additionally serves to provide hydromechanically enhanced substance retention and surface area, upon which, the introduced micro-organisms from a biofilm for the purpose of matter retention and/or decomposition. The media may be placed in a tangential or parallel orientation to the flow of input water.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1, is a depiction of a reactive grease separation assembly comprised of a media matrix (1). The media matrix comprised of at least one inner core (70) received into a tube (20). The media matrix (1) depicted is comprised of a plurality of tubes (20) each receiving at least one inner core (70). Each tube (20) is sized to receive an elongated media inner core (70. The inner core (70) having a plurality of vanes (90), and as depicted having eight vanes (90). The at least a plurality of vanes (90) extending from a central core element (95) where the central core element (95) coincides with the tube axis (25). The central core element (95) of at least one inner core (70) parallel with the central core element (95) of other at least one inner core (70).

The at least one inner core (70) has a top (75) and a bottom (80) and a length (85). The tube (20) having a tube top (25), tube bottom (30) and tube length (35) and tube (20) having a tube axis (37) centrally positioned from the tube top (25) to the tube bottom (30) and extending throughout the tube length (35) of each tube (20). The tube (20) in the preferred embodiment being cylindrical but not thereby limited to other geometric cross-sections and shapes. The tube length (35) generally less than the inner core length (85). As will be appreciated by one of ordinary skill in the art, the tube (20) receiving at least on inner core (7) may be positioned at any location along the inner core length (85), i.e., such that the tube top (25) is proximal the inner core top (75), such that the tube bottom (30) is proximal the inner core bottom (80) or such that the tube (20) is positioned intermediate the inner core top (75) and inner core bottom (80).

The tube (20) having an inner wall (140) where at least one depression or groove (150) is formed in the inner wall (140) which receives at least one vane (90), of the at least one inner core (70) received into the tube (20), at a vane trip (98) and, as depicted, at least two vane tips (98) are received respectively into at least two grooves (150) formed in the inner wall (140). The groove (150) comprising vane (90) restraining means securing the at least one inner core (70) in a fixed position within said tube (20). It will be appreciated by those of ordinary skill in the arts that the groove (150) may be a structure extending from the inner wall (140) forming a groove (150) which will receive at least one vane (90). Alternatively it is understood that the groove (150) may be a depression formed into the inner wall (140) capable of receiving the at least one vane (90). As will be appreciated by one of ordinary skill in these arts, vane (90) restraining means may be by a friction fit between the vane tip (98) when received into a groove (150). In the preferred embodiment at least two depressions or grooves (150) are formed in the inner wall (140) with each of said grooves (150) receiving at least one vance (90). The at lease one vane having a vane surface (92). The at least one vane (90) extending from the central core element (25) along the length of said central core element (25). The surface (92) covered with a biofilm (97). In the preferred embodiment at least eight vanes (90) are spaced equidistant from the adjoining vane (90) and extending from the central core element (25).

The tube (20) having an outer wall (190) having at least one fin (200) extending outwardly therefrom. As depicted the tube (20) has at least four fins (200) extending from said outer wall (190). However, one of ordinary skill in the arts will appreciate the fins of 1 . . . n may be employed in accordance with the space available and surface area desired. The fin (200) is generally elongated having a fin surface (210) and, in the preferred embodiment, extends outwardly from the tube outer wall (190). Where a plurality of tubes (20) are utilized the plurality of tubes (20) contact adjacent tubes (20) at the respective tube outer walls (190) at least one contact point (195) where, in the preferred embodiment, affixing means, and other methods or devices as are appreciated by those in the affixing arts, are utilized to fix adjacent tubes together and hence to fix the position of the plurality of tubes (20) within the media matrix (1). Tube at least one contact points (195) are, in the preferred embodiment, flattened surfaces extending from the tube top (25) to the tube bottom (30) parallel with the tube axis (37). In an alternative embodiment, tubes (20) in a media matrix (1) may be alternatively or additionally fixed in position by affixing means employed at an intersection of fins (200) of adjoining tubes (20).

The tube inner wall (140) having an inner wall surface (142), the tube outer wall (190) having an outer wall surface (192). Inner wall surface (142), outer wall surface (192), vane surface (92) and fin surface (210) receive biofilm (97).

DETAILED DESCRIPTION

An interactive biomedia or media matrix (1) constructed from plastic or other application suitable material with an eight vaned (92) inner structure means (90) comprising an inner core (70) having an inner core length (85) and a finned (200) cylindrical outer structure (20) comprising a tube (20) having a tube length (35), both of varying length, depending upon requirements, is placed in containments means (250) including grease separator media matrix containers (250) of varying configuration as required.

Fluid flow tangential to the vane structure induces vortices to form in the fluid. The low pressure area in the center of the vortices facilitates particle to particle collision coalescence and greater separation efficiency of suspended matter with buoyant material being retained in the upper cylindrical portion of the media and settleable material collecting at the base. Retained organic material can then be decomposed by biofilm formed on the surface of the media.

Figure 1:
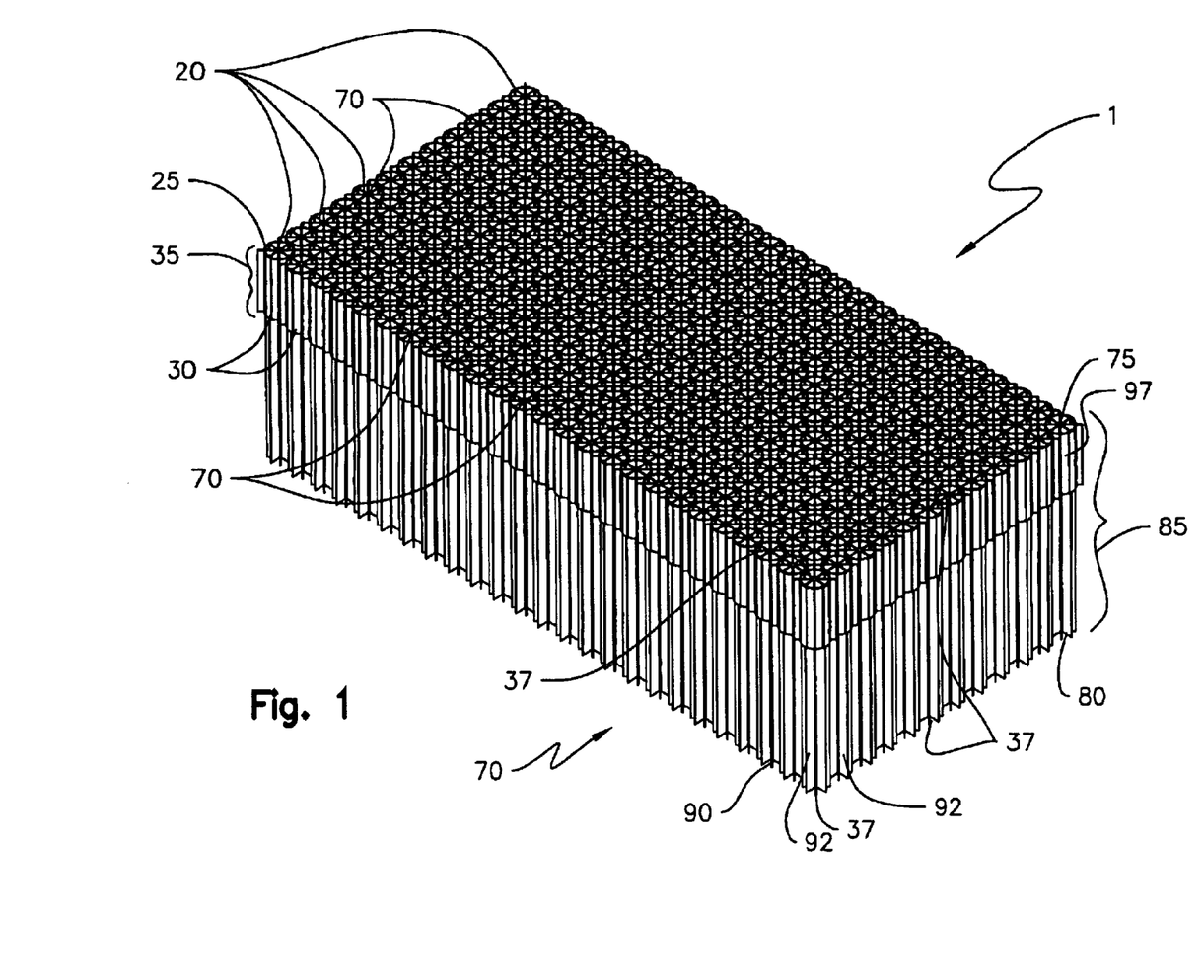

FIGS. 1, 2, 3, 4, 5, 5A, 6, 7, 8, 9, 10 and 11 is a depiction of a reactive grease separation assembly including a media matrix (1). The media matrix (1), seen in FIG. 1, is comprised of at least one inner core (70) received into a tube (20). The media matrix (1) depicted is comprised of a plurality of tubes (20) each receiving at least one inner core (70). Each tube (20) is sized to receive an elongated media inner core (70. The inner core (70) having a plurality of vanes (90), and as depicted having eight vanes (90). The at least a plurality of vanes (90) extending from a central core element (95) where the central core element (95) coincides with the tube axis (25). The central core element (95) of at least one inner core (70) is generally parallel with the central core element (95) of other at least one inner core (70).

The at least one inner core (70) has a top (75) and a bottom (80) and a length (85). The tube (20) having a tube top (25), tube bottom (30) and tube length (35) and tube (20) having a tube axis (37) centrally positioned from the tube top (25) to the tube bottom (30) and extending throughout the tube length (35) of each tube (20). The tube (20) in the preferred embodiment being cylindrical but not thereby limited to other geometric cross-sections and shapes. The tube length (35) generally less than the inner core length (85). As will be appreciated by one of ordinary skill in the art, the tube (20) receiving at least one inner core (70) may be positioned at any location along the inner core length (85), i.e., such that the tube top (25) is proximal in the inner core top (75), such that the tube bottom (30) is proximal the inner core bottom (80) or such that the tube (20) is positioned intermediate the inner core top (75) and inner core bottom (80).

The tube (20) having an inner wall (140) where at least one depression or groove (150) is formed in the inner wall (140) which receives at least one vane (90), of the at least one inner core (70) received into the tube (20), at a vane tip (98) and, as depicted, at least two vane tips (98) are received respectively into at least two grooves (150) formed in the inner wall (140). The groove (150) comprising vane (90) restraining means securing the at least one inner core (70) in a fixed position within said tube (20). It will be appreciated by those of ordinary skill in the arts that the groove (150) may be a structure extending from the inner wall (140) forming a groove (150) which will receive at least one vane (90). Alternatively it is understood that the groove (150) may be a depression formed into the inner wall (140) capable of receiving the at least one vane (90). As will be appreciated by one of ordinary skill in these arts, vane (90) restraining means may be by a friction fit between the vane tip (98) when received into a groove (150). In the preferred embodiment at least two depressions or grooves (150) are formed in the inner wall (140) with each of said grooves (150) receiving at least one vane (90). The at lease one vane having a vane surface (92). The at least one vane (90) extending from the central core element (25) along the length of said central core element (25). The surface (92) covered with a biofilm (97). In the preferred embodiment at least eight vanes (90) are spaced equidistant from the adjoining vane (90) and extending from the central core element (25).

The tube (20) having an outer wall (190) having at least one fin (200) extending outwardly therefrom. As depicted the tube (20) has at least four fins (200) extending from said outer wall (190). However, one of ordinary skill in the arts will appreciate that fins of 1 . . . n may be employed in accordance with the space available and surface area desired. The fin (200) is generally elongated having a fin surface (210) and, in the preferred embodiment, extends outwardly from the tube outer wall (190). Where a plurality of tubes (20) are utilized the plurality of tubes (20) contact adjacent tubes (20) at the respective tube outer walls (190) at at least one contact point (195) where, in the preferred embodiment, affixing means other methods or devices as are appreciated by those in the affixing arts, are utilized to fix adjacent tubes together and hence to fix the position of the plurality of tubes (20) within the media matrix (1). Tube at least one contact points (195) are, in the preferred embodiment, flattened surfaces extending from the tube top (25) to the tube bottom (30) parallel with the tube axis (37). In an alternative embodiment, tubes (20) in a media matrix (1) may be alternatively or additionally fixed in position by affixing means employed at an intersection of fins (200) of adjoining tubes (20).

The tube inner wall (140) having an inner wall surface (142), the tube outer wall (190) having an outer wall surface (192). Inner wall surface (142), outer wall surface (192), vane surface (92) and fin surface (210) receive biofilm (97).

Figure 2:
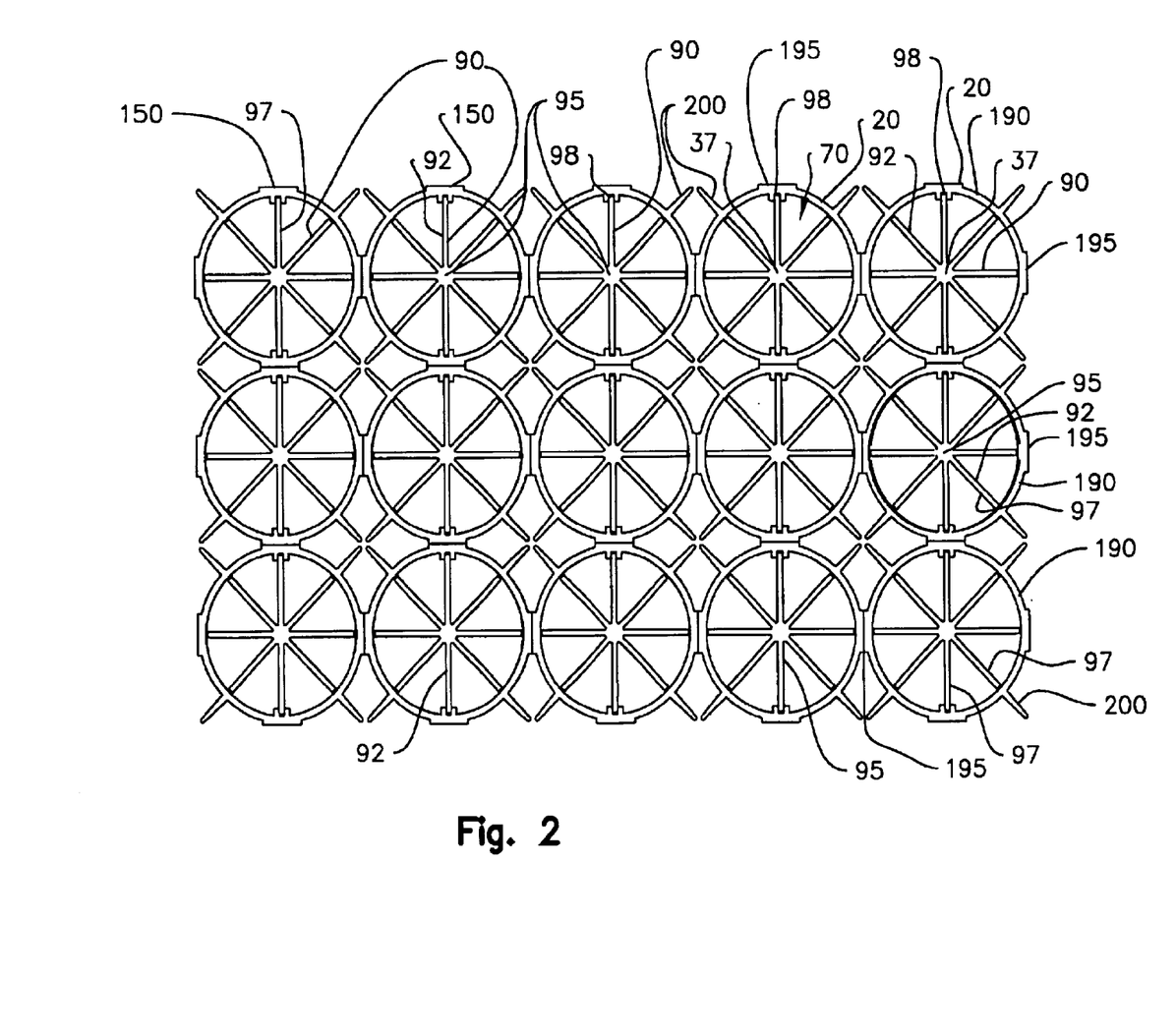
Figure 3:
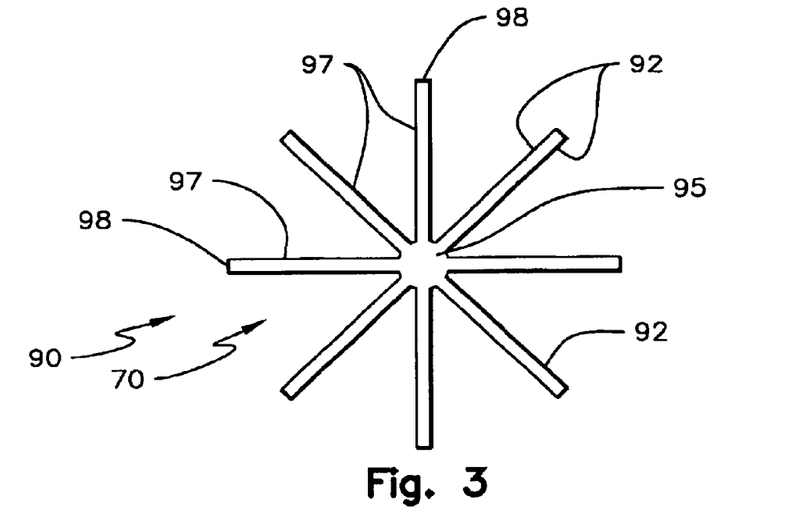
FIG. 3 is a section view of an inner core showing a plurality of vanes.
Figure 4:
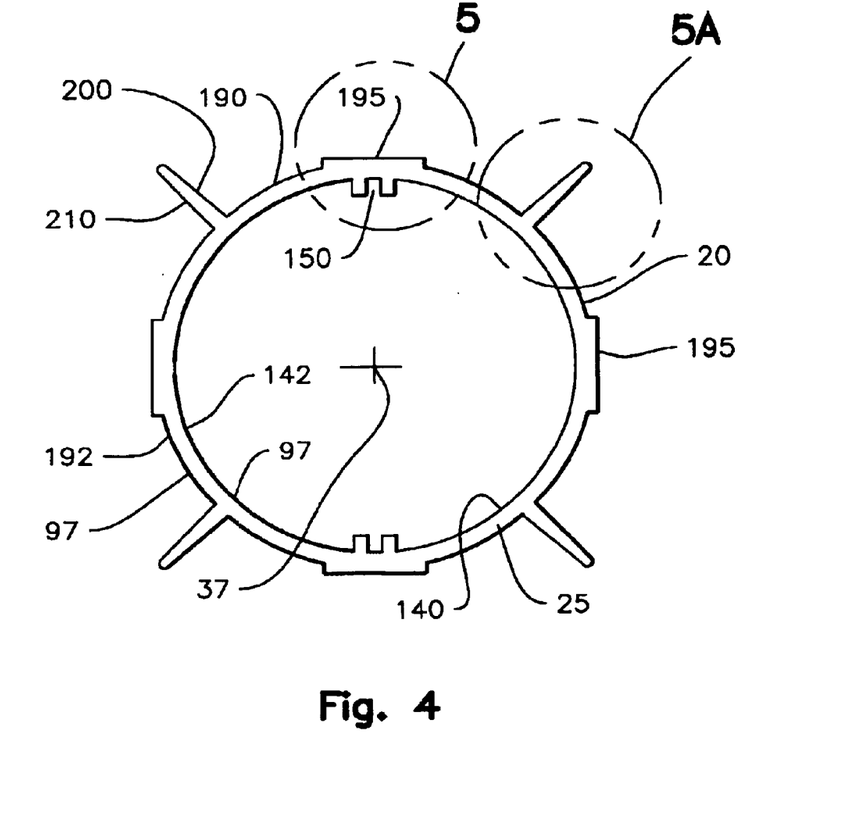
FIG. 4 is a section view of a tube showing an inner wall, an outer wall, at least one groove and at least one fin.
Figure 5:
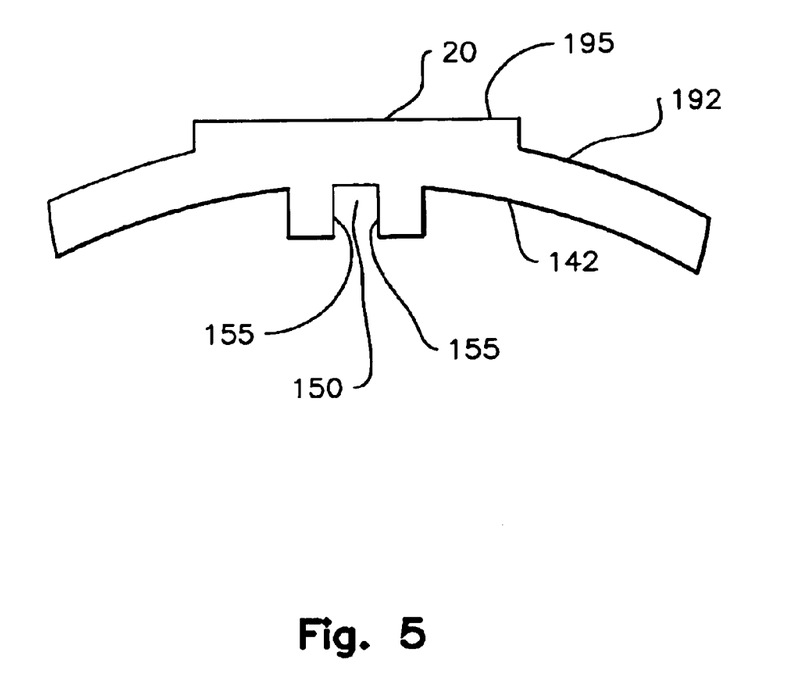
FIG. 5 is a detail showing the tube (20) with a groove (150) which receives at least one vane (90).
Figure 5A:
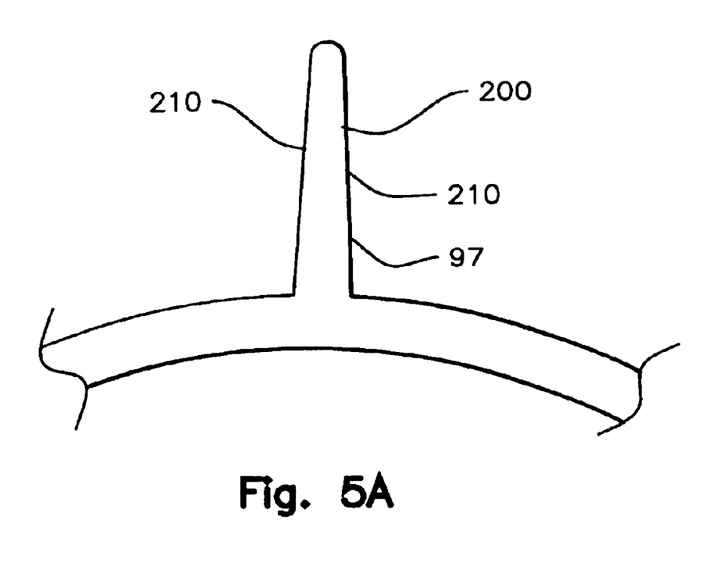
FIG. 5A is a detail from FIG. 4 showing a fin (200) having a fin surface (210).
Figure 6:
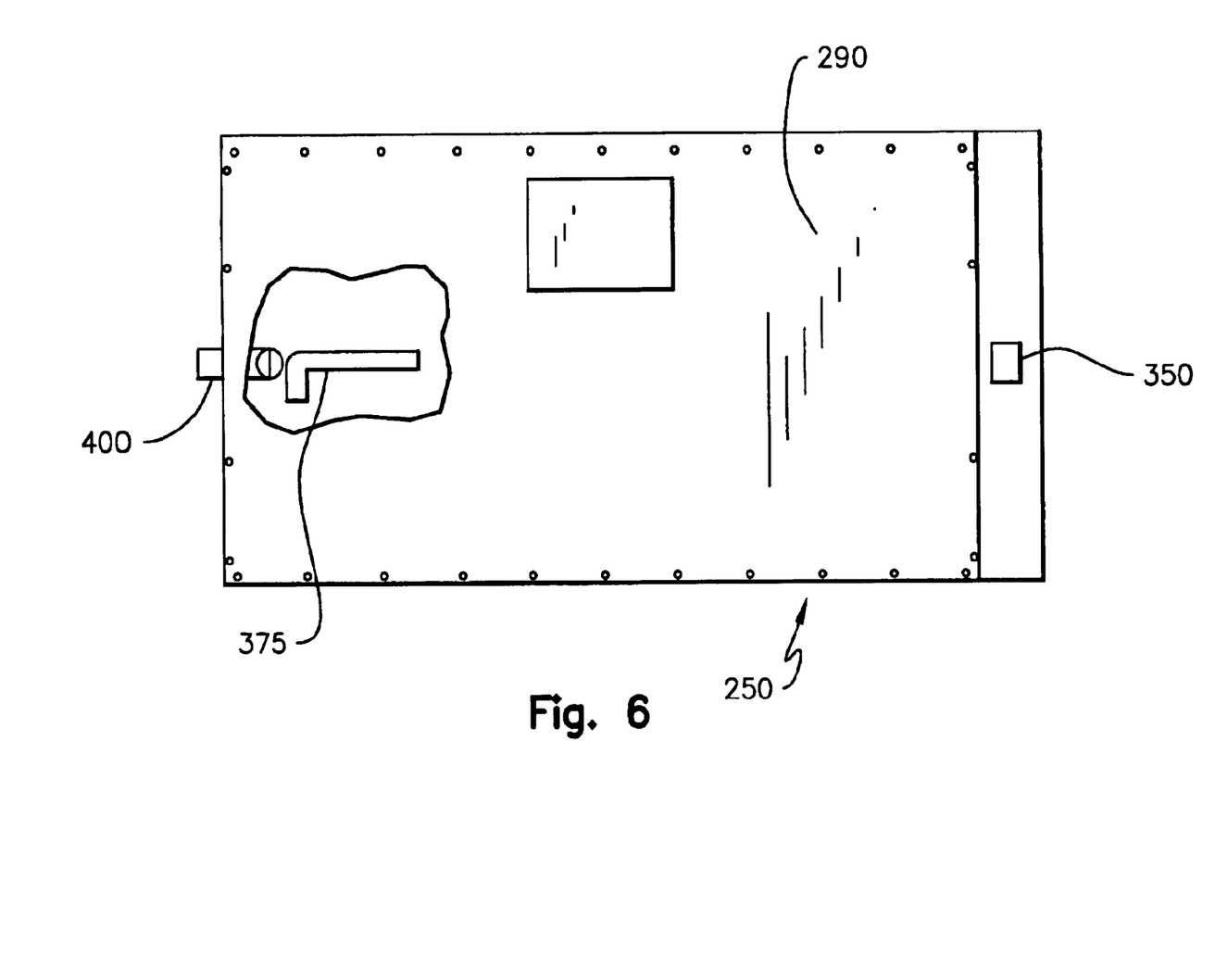
FIG. 6 is a top view of a grease separator media matrix container (250). The top (290) is depicted. Wastewater inlet (350) and discharge pipes (400) are depicted.
Figure 7:
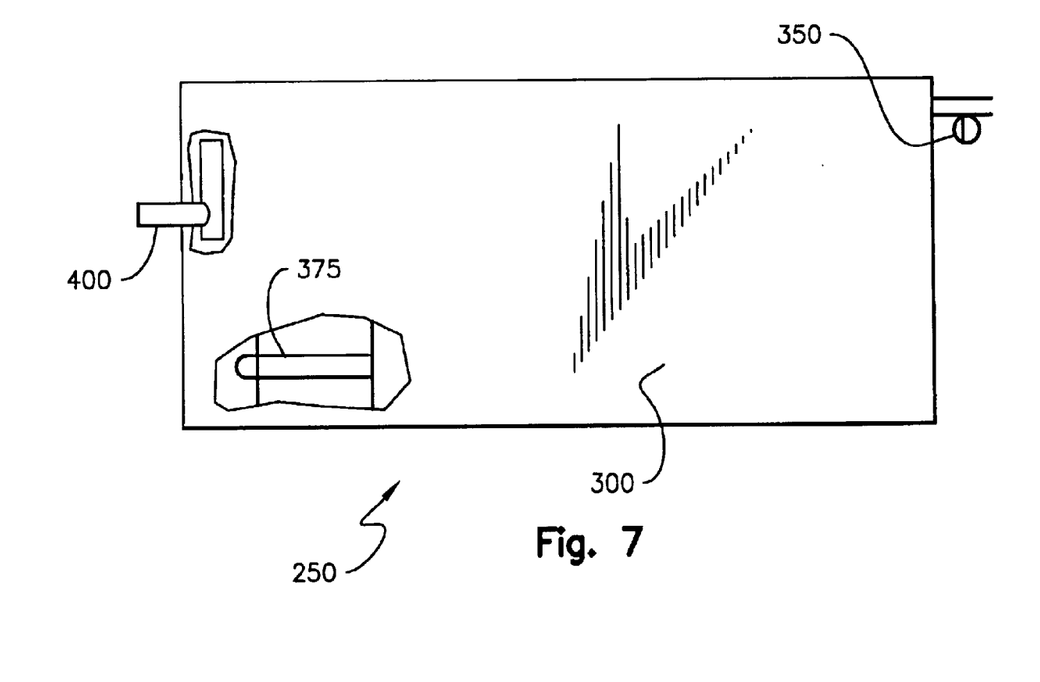
FIGS. 7, 9 and 11 depict the grease separator media matrix container (250) in back view, section view and side view. Wastewater inlet and discharge pipes are depicted
Figure 8:
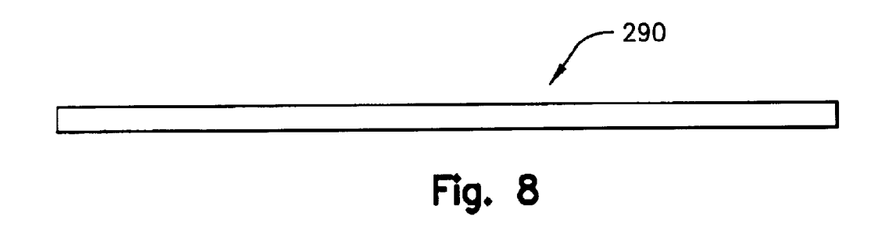
FIG. 8 depicts the top.
Figures 9, 10:
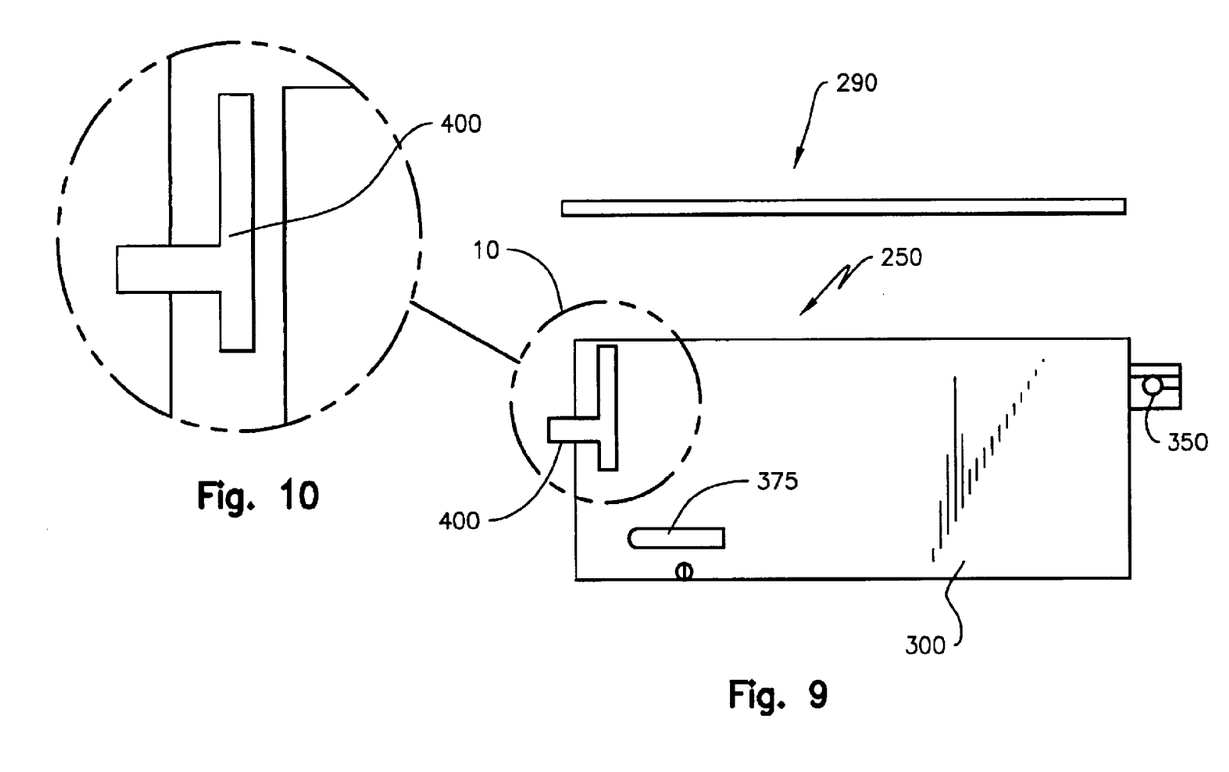
FIG. 10 is a detail from FIG. 9 showing the discharge piper (400). .
Figure 11:
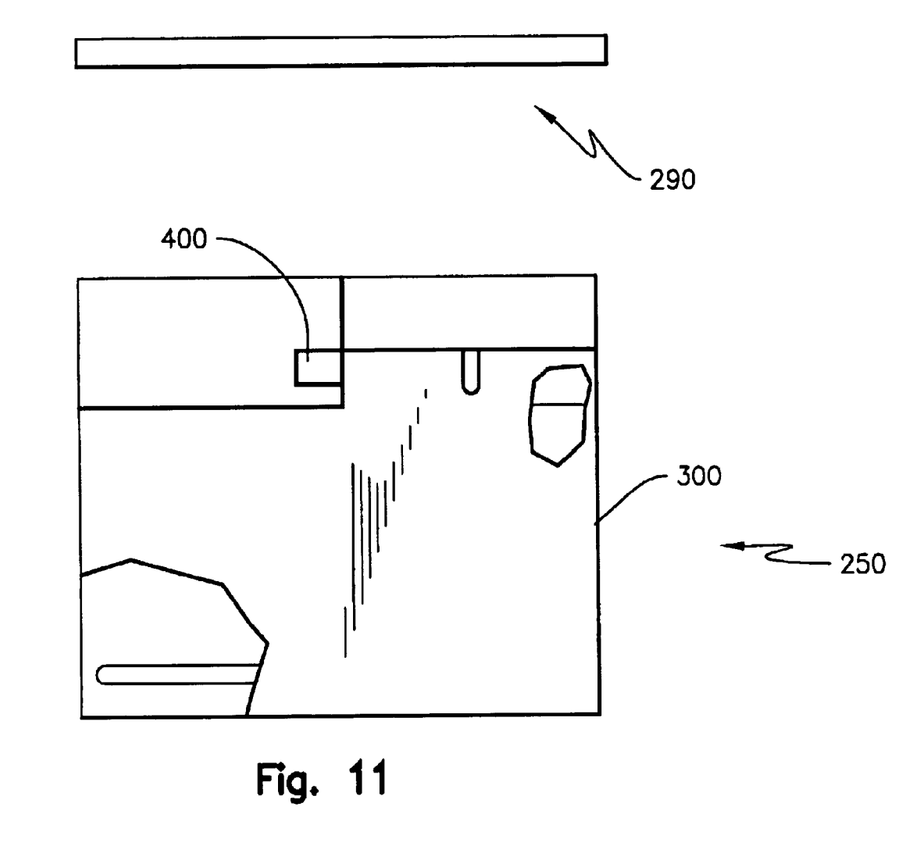

FIG. 2 is a top plan view of a media matrix (1). FIG. 3 is a section view of an inner core (90) showing a plurality of vanes (92). FIG. 4 is a section view of a tube (20) showing an inner wall (140), an outer wall (190), at least one groove (150) and at least one fin (200). FIG. 5 is a detail showing the tube (20) with a groove (150) which receives at least one vane (90). FIG. 5A is a detail from FIG. 4 showing a fin (200) having a fin surface (210). FIG. 6 is a top view of a grease separator media matrix container (250). The top (290) is depicted. Wastewater inlet (350) and discharge pipes (400) are depicted. FIGS. 7, 9 and 11 depict the grease separator media matrix container (250) in back view, section view and side view. Wastewater inlet and discharge pipes are depicted.

What is claimed is:

1. A waste liquid treatment system comprising the following:

A. a media matrix (1) comprised of at least one inner core (70) received into at least one tube (20);

B. the media matrix (1) received into a media matrix container (250) having wastewater inlet (350) and discharge means (400), C. the media matrix (1) is comprised of a plurality of tubes (20) each sized to receive at least one elongated inner core (70);

D. the at least one inner core (70) has a top (75), a bottom (80) and a length (85);

E. the tube (20) having a tube top (25), tube bottom (30) and tube length (35) and a tube axis (37); the tube axis (37) centrally positioned from the tube top (25) to the tube bottom (30) and extending throughout the tube length (35) of each tube (20);

F. the inner core (70) having at least one vane (90);

G. the at least one vane (90) extending from a central core element (95) where the central core element (95) coincides with the tube axis (25).

H. the inner core (70) having a plurality of vanes (90); the central core element (95) of at least one inner core (70) parallel with the central core element (95) of other at least one inner core (70);

I. the tube length (35) generally less than the inner core length (85),

J. The tube (20) having an inner wall (140) where at least one groove (150) is formed in the inner wall (140); said at least one groove (150) sized to receive at least one vane (90);

K. the at least one groove (150) receives and restrains at least one vane (90) of the at least one inner core (70) in a position within said tube (20);

L. the tube (20) having an outer wall (190) having at least one fin (200) extending outwardly therefrom.

2. A waste liquid treatment system of claim 1 further comprising:

A. the tube (20) receiving at least one inner core (70) may be positioned at any location along the inner core length (85);

B. the at least one inner core (70) having at least eight vanes (90).

3. A waste liquid treatment system of claim 2 further comprising:

A. of the at least one vane (70) received into the at least one depression or at least one groove (150) at a vane tip (98), B. groove walls (155) extending from the inner wall (140) forming the at least one depression or at least one groove (150); said at least one groove (150) comprising a vane tip (98) restraining means.

4. A waste liquid treatment system of claim 3 further comprising:

A. vane (90) restraining means by a friction fit between the vane tip (98) and groove walls (155) when received into the groove (150)

B. at least two depressions or at least two grooves (150) are formed in the inner wall (140) with each of said grooves (150) receiving at least one vane (90).

5. A waste liquid treatment system of claim 4 further comprising:

A. the at least one vane (90) having a vane surface (92);

B. the at least one vane (90) extending from the central core element (25) along the length of said central core element (25); the surface (92) covered with a biofilm (97);

C. the at least eight vanes (90) are spaced equidistant from the adjoining vane (90) and extend from the central core element (25).

6. A waste liquid treatment system of claim 5 further comprising:

A. at least four fins (200) extending from said outer wall (190);

B. the fin (200) is generally elongated having a fin surface (210);

C. the plurality of tubes (20) contact adjacent tubes (20) at the respective tube outer walls (190) at least one contact point (195) where affixing means fix adjacent tubes together and hence to fix the position of the plurality of tubes (20) within the media matrix (1).

7. A waste liquid treatment system of claim 5 further comprising:

A. contact point (195) affixing means;

B. at least fins 1 . . . n extending outwardly from the outer wall (190);

C. at least one contact points (195) comprised of flattened portion of the outer wall surface (195) extending from the tube top (25) to the tube bottom (30) parallel with the tube axis (37).

8. A waste liquid treatment system of claim 7 further comprising:

A. said tubes (20) in the media matrix (1) may be alternatively or additionally fixed in position by fin (200) affixing means employed at an intersection of fins (200) of adjoining tubes (20).

9. A waste liquid treatment system of claim 8 further comprising:

A. the tube inner wall (140) having an inner wall surface (142), the tube outer wall (190) having an outer wall surface (192); inner wall surface (142), outer wall surface (192), vane surface (92) and fin surface (210) receives biofilm (97).

10. A waste liquid treatment system of claim 9 further comprising:

A. wastewater inlet (350) and discharge means (400) comprising pipes; the wastewater inlet (350) directs flow of wastewater into the media matrix (1); the discharge pipes (400) discharges from the media matrix container (250).

* * * * *